Jan. 8, 1963   B. W. LERCH   3,071,809
METHODS OF AND APPARATUS FOR EXTRUDING PLASTIC MATERIALS
Filed May 9, 1960   2 Sheets-Sheet 1
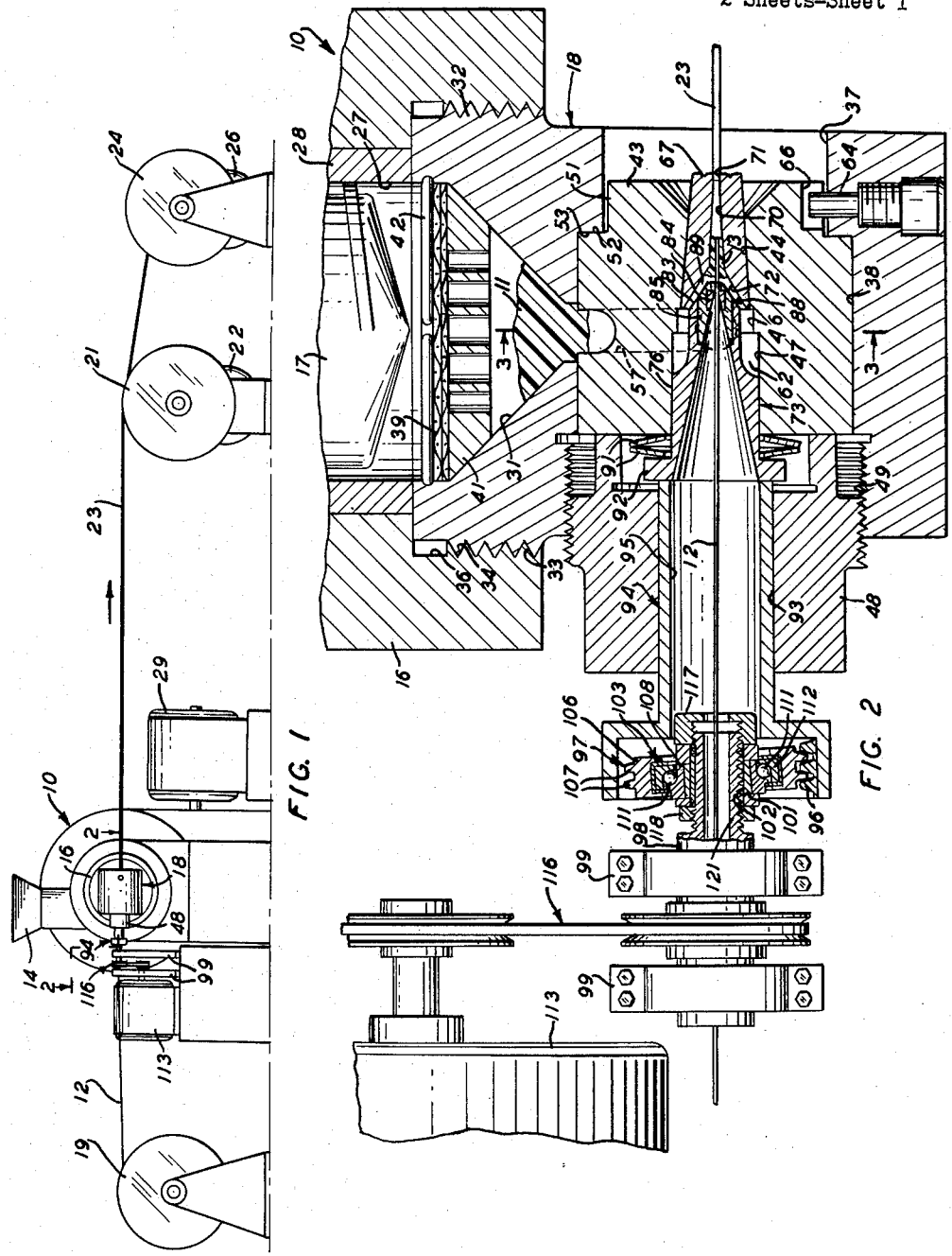
INVENTOR
B. W. LERCH
BY Don P. Bush
ATTORNEY INVENTOR
B. W. LERCH
BY Don P. Bush
ATTORNEY United States Patent Office 3,071,809
Patented Jan. 8, 1963

3,071,809
METHODS OF AND APPARATUS FOR
EXTRUDING PLASTIC MATERIALS
Brooke W. Lerch, Stoneleigh, Md., assignor to Western
Electric Company, Incorporated, New York, N.Y., a
corporation of New York
Filed May 9, 1960, Ser. No. 27,726
8 Claims. (Cl. 18—13)

The present invention relates to new and improved methods of and apparatus for extruding plastic materials. The invention relates more particularly, although not exclusively, to methods of and apparatus for reducing the detrimental effects of "melt fracture" of plastic materials caused in relatively small cross-sectional passages through which the plastic materials are forced in the extruding apparatus at relatively high velocities.

In a plastics extruder, the flow of the plastic material in the extruder head influences various properties of the extrudate such as the smoothness and the density of the extrudate emerging from the die of the extruder. There is a tendency for the extrudate to be rough and beady when certain plastic materials are extruded at certain speeds, temperatures and pressures on filamentary cores having certain surface characteristics and travelling at certain speeds.

Considerable work has been conducted in investigating the flow in a number of noncross-linked plastic materials, such as polyethylene, through extrusion dies. It has been observed that material such as polyethylene flows irregularly when the driving pressure or shear stress reaches a critical value. It is believed by some that this behavior is common to all plastic materials at some specific shear stress. It is believed that the critical shear stress is reached when the molten plastic material in the region near the entrance of the extrusion die tears or fractures, and this phenomena has been termed "melt fracture."

Investigations have shown that higher rates of extrusion without increased rates of shearing can be obtained when the entrance to the extrusion die is tapered conically with an included angle preferably not exceeding 20°. High operating temperatures with a resultant lowering of the consistency or viscosity of the melted plastic material also contributes toward higher extrusion rates.

It has also been observed that a certain amount of reduction in the critical shear stress and rate of certain plastic materials occurs by using optimum lengths and cross-sectional areas of the annular space between the filamentary core being covered and the die of the extruder through which the plastic material flows. It is theorized that this may be due to the viscosity changes across the velocity gradient (shear rate) within the annular clearance between the core and the die. It is thought by some that melt fracture might result in definite processing speed limits on the rate of flow of the plastic compound in many extrusion applications, which would include wire coating or insulating and cable sheathing. However, it is not known what these limits of speed of the plastic compound may be in terms of feet per minute.

Despite the fact that experience to date has indicated that a minimum restricting area in the path of travel of the plastic material through the extrusion apparatus prior to its exit from the die should always be greater than the free area between the core and the die at the exit end thereof, it has been found that a marked improvement in the surface finish of thin wall insulation, produced at 2200 feet per minute, could be obtained by utilizing a throttle-type extrusion tool. In this type of extrusion tool, the plastic before it proceeds through the die passes through a passage of an annular cross section formed by the clearance between the tip of the core tube and the approach of the die. The plastic material is forced through this narrow annular passage formed by the clearance between the core tube tip and the approach of the die under high pressure with a resultant rapid change in its temperature and viscosity. The increased pressure in the clearance between the core tube tip and the die produces increased shearing of the plastic.

The filamentary core being covered is guided close to the die by the core tube which results in "melt fracture" occurring in the plastic material between the core tube and die. The melt fracture causes pulsations in the plastic material exiting from the end of the die and thus causes beadiness and roughness of the surface of the extrudate. Under these conditions, the resistance of the plastic material to fracture as it approaches and enters the die is relatively low, particularly when extrusion pressure in the extrusion cylinder ahead of the annular passage formed by the clearance between the core tube and die is in the neighborhood of 8000 p.s.i. and the filamentary core is travelling at approximately 2200 feet per minute.

An object of the present invention is to provide new and improved methods of and apparatus for extruding plastic materials.

Another object of the present invention is to provide new and improved methods of and apparatus for extruding plastic insulation on a filamentary core, such as an elongated electrically conductive core or the like.

A further object of the present invention is to provide methods of and apparatus for reducing the detrimental effects of "melt fracture" of plastic materials.

A still further object of the present invention is to provide new and improved methods of and apparatus for extruding plastic material on a filamentary core in which the roughness and beadiness of the plastic materials being extruded on the conductive core are reduced or eliminated.

A method of extruding plastic materials embodying certain principles of the present invention may include the steps of forcing the insulated material through an annular space between a core tube and a die, and simultaneously reciprocating the core tube axially with respect to the die to cause high frequency variations in the annular spacing therebetween so that melt fracture and thus roughness and beadiness of the surface of plastic material are reduced.

An apparatus for extruding plastic materials embodying certain principles of the present invention may include an extrusion head having a longitudinally extending extrusion passage formed therein, a forming die mounted at the exit end of the extrusion passage and a stationary or continuously moving core extending through the orifice of the die. A core tube surrounds a portion of the core, cooperates with the extrusion die to form a passage having an annular cross section and is reciprocable with respect to the die. Means are provided for reciprocating the core tube axially with respect to the die to cause high frequency variations in the space between the die and core tube so that melt fracture and thus beadiness and roughness of the surface of the extrudate are reduced.

Other objects and advantages of the invention will be more readily understood from the following detailed description of apparatus forming specific embodiments thereof, when read in conjunction with the appended drawings, in which:

FIG. 1 is a side elevation of extruding apparatus forming one embodiment of the invention;

FIG. 2 is an enlarged, fragmentary section of the extruding apparatus of FIG. 1, taken along line 2—2 thereof;

Figure 3:
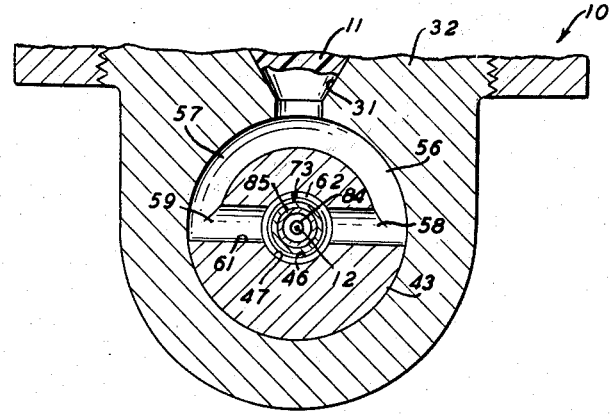
FIG. 3 is a reduced, fragmentary section of the extruding apparatus of FIG. 2, taken along line 3—3 thereof.

Referring now to the drawings, and more particularly to FIGS. 1, 2 and 3 thereof, there is shown a cross-head or L-head type extruding apparatus, designated generally by the numeral 10 forming a preferred embodiment of the present invention. The extruding apparatus 10 is provided to extrude plastic material 11 on a filamentary core or conductor 12 to form an insulating sheath or covering 13 therearound. The suitable plastic material 11 is placed in a hopper 14 and from there it flows to an extrusion cylinder 16. A stock screw 17 (FIG. 2) is positioned within the extrusion cylinder 16 and is rotated to knead and advance the plastic material 11 toward a delivery end of the extrusion cylinder 16 where an extrusion head, designated generally by the numeral 18, is secured. The conductor 12 is pulled through the extrusion head 18 of the extrusion apparatus 10 from a supply stand 19 by a capstan 21 driven by suitable means, such as a motor 22. The conductor 12, exiting from the extruder head 18 as an insulated conductor 23, passes around the capstan 21 and is wound subsequently upon a take-up reel 24 driven by suitable means, such as a motor 26.

Referring now to FIG. 2, there is shown the extrusion cylinder 16 having the elongated cylindrical extrusion bore 27 formed by a cylindrical lining 28, which is secured rigidly in the cylinder 16 and, in turn, in which the stock screw 17 is mounted rotatably. The stock screw 17 is designed to be rotated by a conventional drive means 29 (FIG. 1) such as an electric motor, for the purpose of working and forcing the plastic material 11 along the extrusion bore 27 and into and through a tapered opening 31 in a body portion 32 forming part of the extrusion head 18.

The extrusion head 18 is mounted detachably in the discharge end of the extrusion cylinder 16 by external threads 33 on the body portion 32 engaging corresponding internal threads 34 within a counterbore 36 in the extrusion cylinder 16 so that the tapered opening 31 therein forms a continuation of the extrusion bore 27. The tapered opening 31 communicates with a bore 37 and a counterbore 38 formed, in the body portion 32 of the extrusion head 18, transversely with respect to the longitudinal axis of the extrusion bore 27. A screen pack 39 and a backing plate 41 are mounted transversely across the discharge end of the bore 27, supported within the head 18 and secured in place by a snap ring 42. The screen pack 39 strains out any lumps or foreign particles in the plastic material 11, and also performs a mixing action on the material 11.

A generally cylindrical capsule or tool holder 43, having a frustoconical bore 44 and cylindrical counterbores 46 and 47, all of which are formed coaxially therein, is mounted within the bore 37 and the counterbore 38 in the body portion 32, and is held in place by means of an externally threaded retainer nut 48. The retainer nut 48 is engaged threadedly within complementary threads 49 of the counterbore 38 formed in the body portion 32. A reduced cylindrical portion 51 of the tool holder 43 forms a shoulder 52 thereon, and is placed within the bore 37 in the body portion 32 so that the shoulder 52 is in abutment with a corresponding radially inwardly projecting shoulder 53 formed by the bore 37 and the counterbore 38 in the body portion 32.

Referring now to FIGS. 2 and 3, the tool holder 43 is provided with two, identical, interconnected, generally arcuate-shaped channels 56 and 57 formed on the peripheral surface thereof. The channels 56 and 57 extend arcuately in opposite directions from the exit end of the tapered opening 31 in the body portion 32 to diametrically opposed, radially extending ports 58 and 59, respectively, formed by a common radial bore 61 through both sides of the tool holder 43. The ports 58 and 59, in turn, communicate with a pressure-equalizing chamber 62 formed within the counterbores 46 and 47 formed in the tool holder 43.

The feed ports 58 and 59 are identical in size and preferably are circular in cross section. The feed ports 58 and 59 are positioned diametrically opposite to each other and symmetrical with respect to a horizontal plane containing a longitudinal axis of the extrusion cylinder 16, whereby the ports 58 and 59 are spaced equidistantly from the exit end of the tapered opening 31 in the body portion 32. The tool holder 43 is held in this position and prevented from rotating in the core 37 and counterbore 38 in the body portion 32 by the use of a screw means 64 projecting into a cooperating slot 66 in the tool holder 43.

A generally frustoconical-shaped extrusion die 67 is positioned coaxially within a complementary die receiving seat formed in the tool holder 43 by the frustoconical bore 44 therein. The die has a relatively short cylindrical central bore 71 forming a relatively short cylindical land through which the conductor 12 and plastic material 11 passes to form the insulated conductor 23. The die 67 has a pair of interconnected, frustoconical counterbores 70 and 72 to cooperate with the cylindrical bore 71 to form the die orifice.

A hollow core tube or core guide, designated generally by the numeral 73, has a substantially cylindrical portion 76 intermediate the ends thereof which is mounted slidably in the counterbore 47 so that the free end 83 of the core tube 73 extends coaxially through the core 46 and into the die 67. The free end 83 of the core tube 73 has a diamond die 84 and a diamond die holder 85 mounted therein. The diamond die holder 85 cooperates with the free end 83 of the core tube 73 to form a frustoconical tip, designated generally by the numeral 88. The tip 88 is shaped complementary to the frustoconical counterbore 72 in the extrusion die 67, and cooperates therewith to form a valving mechanism of a "throttle-type extruder" for controlling the properties of the extruded insulating covering 13.

The rate that the plastic material 11 flows from the extrusion bore 27 through the passage 31, into the chamber 62, and into the die 67 is controlled by controlling the position of the core tube 73 with respect to the die 67. If desired, the plastic material 11 can be completely cut off from the die 67 by making the tip 88, formed by the ends of the core tube 73 and the diamond die holder 85, seat within the frustoconical counterbore 72 of the die 67. However, it is desirable to have the core tube 73 and die 67 so constructed and positioned that a substantially frustoconical passage 89 having an annular cross section will exist therebetween in which a unitary conical stream of plastic material 11 having the cross-sectional area approximately four or five times as large as that of the sheath or covering 13 enveloping the conductive core 12.

Figure 4:
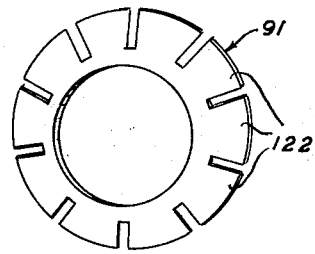
FIGS. 4 and 5 are enlarged views of modified Belleville springs forming a portion of the extrusion apparatus of FIG. 1.
Figure 5:
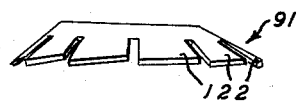

During operation of the extrusion apparatus 10, the extrusion pressure of the plastic material 11 is exerted always on the tip 88 of the core tube 73 which always tends to urge the core tube 73 toward the retaining nut 48. A cooperating pair of modified "Belleville" springs, designated generally by the numerals 91—91 (FIGS. 2, 4 and 5), encircling the core tube 73 are positioned between the end of the tool holder 43 and the adjacent side of a radially outwardly projecting flange 92. The modified Belleville springs 91—91 cooperate with each other and the pressure of the plastic insulating material 11 in the extrusion head 18, pushing against the tip 88 of the core tube 73, to urge the flange 92 of the core tube 73 toward the retaining nut 48.

The filamentary core 12 being covered must be guided close to the die 67 and to eliminate or minimize the orifice effect between the core tube 73 and the die 67, and, thus, reduce the roughness and beadiness on the surface of the extruded plastic covering 13, the melt space formed by the passage 89 between the tip 88 of the core tube 73 and the approach of the die 67 formed by the counterbore 72 is varied at a high frequency (e.g., a range of from approximately 3000 cycles per second to approximately 25,000 cycles per second) by reciprocating the core tube 73 with respect to the die 67. The high frequency reciprocation of the tip 88 with respect to the approach of the die 67 will tend to eliminate the undesirable pulsations at the exit of the die 67 and make a smooth insulating covering 13 on the core 12. Under these conditions, the resistance of the plastic material 11 to fracture as it approaches, enters and passes through the die 67 can be increased, even though the extrusion pressure in the extrusion cylinder 16 is in the region of 8000 p.s.i. Further, extruded insulating covering 13 having still better properties can be produced by rotating the core tube 73 simultaneously with the reciprocation thereof. The range of rotating speeds is preferably approximately 100 to 2000 revolutions per second depending on the particular circumstances.

To permit the spacing between the die 67 and tip 88, formed by the end of the diamond die holder 85 and adjacent portion of the core tube 73 in the valve formed thereby, to be varied at a high frequency, the retaining nut is provided with a cylindrical bore 93 which is designed to receive a flanged cylindrical core tube extension, designated generally by the numeral 94. The extension 94 of the core tube 73 has a central bore 95 through which the conductor 12 passes.

A gear rack 96 is secured adjustably in the outer end of the extension 94. A wobble plate, designated generally by the numeral 97, is secured angularly to a spindle 98 mounted in a pair of trust bearings (not shown) in a pair of pillow blocks 99—99. The wobble plate 97 includes a hub 101 with the spindle mounting hole 102 bored obliquely therein, a conventional axial-thrust bearing, designated generally by the numeral 103, and an outer drive ring 106. The outer periphery of the ring 106 of the wobble plate 97 has annularly shaped gear teeth 107—107 turned therein which extend circumferentially thereof and mate with the gear rack 96 secured in the extension 94.

As the spindle 98 is driven, the hub 101 keyed thereto rotates and imparts to an adjacent inner race 108 of the ball bearing 103, which is secured to the hub 101 by appropriate means (not shown), an oscillatory motion. The oscillatory motion of the inner race 108 is transmitted through the balls 111—111 to the outer race 112 and the drive ring 106 secured thereto. When the spindle 98 is rotated at approximately 10,000 revolutions per second by an electric motor 113, through a belt-and-pulley arrangement, designated generally by the numeral 116, the wobble plate 97 reciprocates the gear rack 96 and thus the tip 88, with respect to the die 67 at a rate of approximately 10,000 cycles per second with a simple harmonic motion having uniform acceleration and deceleration.

The axial position of the wobble plate 97 on the spindle 98 and thus the position of the tip 88 of the core tube 73 with respect to the die 67 may be adjusted by turning a pair of retaining nuts 117 and 118 on a threaded portion 121 of the spindle 98. The distance that the core tube 73 is moved in either direction may be varied by providing interchangeable wobble plates 97—97 (only one of which is illustrated), canted with respect to the axis of the spindle 98 at varying angles. However, the movement of the tip 88 of the core tube 73 with respect to the die 67 is preferably approximately 0.002 inch to 0.025 inch, depending on the material 11 being extruded and the nominal annular clearance or spacing 89 between the conical tip 88 formed by the core tube 73 and associated diamond die holder 85 and the frustoconical bore 72 in the die 67.

Due to the particular construction of the modified Belleville springs 91—91 (FIGS. 2, 4 and 5) when canted fins 122—122 of the springs 91—91 expand, or resume their normal position, after having been compressed through the action of the wobble plate 97, the fins 122—122 place a torsional stress on the flange 92 of the core tube 73 and cause the core tube 73 to rotate with respect to the die 67 to help improve the properties of the insulating covering 13.

*Operation of Preferred Embodiment*

During the operation of the extruding apparatus 10, the conductor 12 is advanced longitudinally at a predetermined speed in the direction of the arrow shown in FIG. 1. At the same time the suitable plastic material 11, such as polyethylene or the like, is advanced by the rotating stock screw 17 through the extrusion bore 27, screen pack 39, and backing plate 41 into the tapered opening 31 in the extrusion head 18.

Upon leaving the tapered opening 31, the plastic material 11 is split into two separate streams and flows through the symmetrical channels 56 and 57 formed in the outer periphery of the tool holder 43. The two separate streams of plastic material 11 initially flow circumferentially in opposite directions along the channels 56 and 57 in the tool holder 43 to the diametrically opposed feed ports 58 and 59, respectively. The two separate streams then flow through the feed ports 58 and 59, and enter the pressure-equalizing chamber 62.

Since the channels 56 and 57 are identical and the feed ports 58 and 59 are spaced equidistantly from the exit end of the tapered opening 31, the paths traversed by the two separate streams of plastic material 11 are identical in all respects. Accordingly, unbalanced flow of plastic material 11 entering the pressure-equalizing chamber 62 through the feed ports 58 and 59 are effectively damped out.

The conductor 12 is pulled through the extrusion head 18 from the supply stand 19 by the capstan 21. Simultaneously, the plastic material 11 is forced out of the chamber 62 through the substantially frustoconical passage 89 in a unitary conical stream and through the orifice of the die 67 around the conductor 12 to form the insulating sheath 13 around the continuously moving conductive core 12. The size of the substantially frustoconical passage 89, formed by the clearance between the tip 88 of the core tube 73 and the die 67, is varied at a high frequency rate of approximately 10,000 cycles per second by rotating the wobble plate 97 by means of the motor 113. As the wobble plate 97 is rotated approximately 10,000 revolutions per second by the motor 113, through the belt-and-pulley arrangement 116, the gears 107—107 are oscillated and cause the gear rack 96 and thus the tip 88 of the core tube 73 to reciprocate with respect to the die 67 at a rate of approximately 10,000 cycles per second with a simple harmonic motion having uniform acceleration and deceleration. The high frequency variation of melt space in the passage 89 formed between the tip 88 of the core tube 73 and the die 67 eliminates or minimizes the orifice effect of the substantially frustoconical passage 89 formed between the tip 88 of the core tube 73 and the die 67 and thus reduces the roughness and beadiness on the surface of the extruded plastic covering 13.

As the core tube 73 is moved to the right, as viewed in FIG. 2, by the wobble plate 97, the modified Belleville springs 91—91 are compressed. Therefore, when the core tube 73 is moved to the left, as viewed in FIG. 2, by the wobble plate 97, the expanding fins 122—122 of the springs 91—91 place a torsional stress on the flange 92 of the core tube 73 and cause the core tube 73 to rotate with respect to the die 67 to help improve the properties of the insulating sheath 13. The conductor 12, exiting from the extruder head 18 as an insulated conductor 23, passes around the capstan 21 and is wound subsequently upon the take-up reel 24.

Alternative Embodiment

Figure 6:
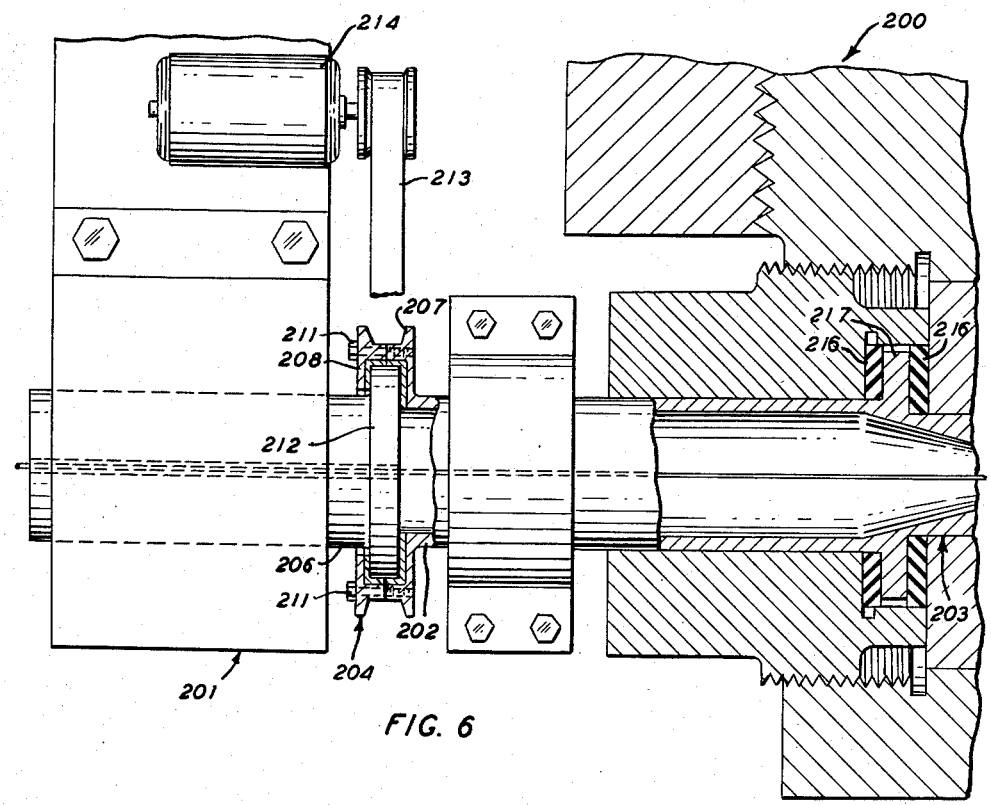
FIG. 6 is a fragmentary sectional view of an extrusion apparatus illustrating an alternative embodiment of the invention.

Referring now to FIG. 6, there is shown a portion of an extruding apparatus, designated generally by the numeral 200, forming an alternative embodiment of the present invention, in which the spindle 98 and wobble plate 97 in the preferred embodiment are replaced by an electrical or electromagnetic vibrator, designated generally by the numeral 201, of a type manufactured by Narda Ultrasonics Corporation, Westbury, Long Island, New York. A reciprocating armature 206 of the vibrator 201 is connected to an integral extension 202 of a core tube, designated generally by the numeral 203, by a combined belt pulley and coupling, designated generally by the numeral 204, which permits the core tube 203 and extension 202 to be rotated with respect to the reciprocating armature 206 of the vibrator 201. A bearing-lined portion 207 of the pulley 204 is formed integrally with the core tube 203 and extension 202. Another bearing-lined portion 208 of the pulley 204 is secured to the portion 207 by screws 211—211 to form a coupling between a flange 212 of the armature 206 and the extension 202 of the core tube 203, which is turned by a motor 214 through the pulley 204 and a belt 213. The magnitude and rate of vibration of the armature 206 of the vibrator 201 may be adjusted to a desired setting, depending on the equipment being utilized, the plastic material being extruded and various other operating conditions.

Instead of utilizing the Belleville springs, a compressible, preloaded, resilient ring 216, made of elastomeric material such as high-temperature, silicon rubbers, is placed on each side of a flange 217 to permit relative reciprocation of the core tube 203 with respect to the die (not shown) at approximately 20,000 cycles per second. However, the higher the frequency within practical limitations, the better the results obtained thereby. The preloading of the resilient rings 216—216 is to overcome forces exerted on the core tube 203 by the plastic material being extruded therethrough. Also, compressible fluids and springs could be used for this purpose. The remaining portions of the apparatus of the alternate embodiment of the invention is substantially identical to those disclosed above with respect to the extruding apparatus 10 forming a preferred embodiment of the invention.

Operation of Alternate Embodiment

The operation of the alternate embodiment is identical to the operation of the preferred embodiment except for the manner in which the core tube 203 is rotated and reciprocated with respect to the die. The size of the substantially frustoconical passage formed between the tip of the core tube 203 and the die is varied at a high frequency by the vibrator 201 at a rate of approximately 20,000 cycles per second to eliminate or minimize the orifice effect between the tip of the core tube 203 and the die and thus reduce the roughness and beadiness on the surface of the extruded plastic covering 13. As the core tube 203 is reciprocated by the vibrator 201, the core tube 203 is rotated simultaneously with respect to the die 67 by the motor 214 through the belt 213 and pulley 204 to help improve the properties of the insulating covering 13.

The term "plastic insulating material," as employed in this specification and the following claims, will be understood to include both thermoplastic insulating materials, such as polyvinyl chloride, polyethylene, or the like, and thermosetting insulating compounds, such as Neoprene compounds, other rubbery elastomers, or the like.

It is obvious that the process described above may be employed for applying coatings or forming tubes of materials other than plastic materials, that the core need not be conductive, and that the apparatus, therefore, may be of any suitable construction, without departing from the spirit and scope of the invention. The core tubes 73 and 203 could be so constructed so as to form a core or mandrel for a tubing operation. It is desirable that a core tube modified accordingly would project into and through the die orifice and may or may not be solid in form depending on whether or not it is desired that the tube be applied to a core or be hollow in form. In the event that it is desirable to make a tube which is hollow in form, the mandrel should be made in two pieces so that the core tube would form an outer sleeve which would be reciprocated with respect to a control mandrel or core and would cooperate therewith in a manner similar to the cooperation of the core tube and core in the preferred embodiment of the invention.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of extruding plastic materials, which comprises forcing plastic material through an annular space between a core tube and a die, and simultaneously reciprocating the core tube axially with respect to the die to cause high frequency variations in the annular space therebetween so that melt fracture and thus roughness and beadiness of the surface of the plastic material are reduced.

2. A method of manufacturing insulated conductors, which comprises advancing a conductor through a core tube and extrusion die, applying an extruded covering of insulating material over the conductor by forcing the insulating material through an annular space between the core tube and the die, and simultaneously reciprocating the core tube axially with respect to the die in a simple harmonic motion to cause high frequency variations in the annular space therebetween so that melt fractures and thus roughness and beadiness of the surface of insulated material are reduced.

3. Apparatus for extruding plastic materials, which comprises an extrusion head having a longitudinally extending extrusion passage formed therein, a forming die mounted at the exit end of the extrusion passage, a core tube positioned adjacent to the forming die and mounted reciprocably with respect thereto, and means for reciprocating the core tube axially with respect to the forming die to cause high frequency variations in the space between the forming die and core tube so that melt fracture and thus beadiness and roughness of plastic material being extruded are reduced.

4. Apparatus for applying a covering of plastic material upon a conductor, which comprises an extrusion head having a longitudinally extending extrusion passage formed therein, a forming die mounted at the exit end of the extrusion passage, a core tube mounted rotatably and reciprocably about the longitudinal axis of the forming die and provided with a longitudinal guiding passage through which a conductor may be advanced into and through the forming die, and means for rotating the core tube and reciprocating the core tube axially with respect to the die to cause high frequency variations in the space between the die and core tube so that melt fracture and thus roughness and beadiness of teh surface of the insulating material are reduced.

5. In an extruding apparatus for applying a continuous covering of an extrudable plastic material to a continuously advancing filamentary core including an extrusion cylinder having a bore formed therein, a stock screw mounted rotatably within the bore for advancing plastic material therealong, and an extrusion head mounted at the exit end of the cylinder and provided with an extrusion passage formed therein which communicates with and extends transversely across the end of the bore formed in the cylinder and a stationary extrusion die positioned at the exit end of the extrusion passage and and having a tapered aperture therein, the improvement which comprises a cylindrical core tube mounted rotatably and slidably within the extrusion passage and having a longitudinally extending bore through which a filamentary conductor may be advanced toward the tapered aperture in the die and having a tapered nose adjacent to and complementary to a portion of said tapered aperture, and a wobble plate for reciprocating the core tube axially continuously with respect to the die in a simple harmonic motion having constant acceleration and deceleration to cause high frequency variations in the space between the die and core tube and to rotate the core tube with respect to the die to reduce the melt fracture of plastic material being extruded on the filamentary core.

6. In an extruding apparatus for applying a continuous covering of an extrudable plastic material to a continuously advancing filamentary core including an extrusion cylinder having a bore formed therein, a stock screw mounted rotatably within the bore for advancing plastic material therealong, and an extrusion head mounted at the exit end of the cylinder and provided with an extrusion passage formed therein which communicates with and extends transversely across the end of the bore formed in the cylinder and a stationary extrusion die positioned at the exit end of the extrusion passage and and having a tapered aperture therein, the improvement which comprises a cylindrical core tube mounted rotatably and slidably within the extrusion passage and having a longitudinally extending bore through which a filamentary conductor may be advanced toward the tapered aperture in the die and having a tapered nose adjacent to and complementary to a portion of said tapered aperture, at least one gear tooth secured to the core tube, a spindle mounted coaxially of the core tube, a wobble plate secured obliquely to the axis of the spindle at a predetermined angle, means for rotating the spindle to reciprocate the core tube axially continuously with respect to the die in a simple harmonic motion having constant acceleration and deceleration to cause high frequency variations in the space between the die and core tube to reduce the melt fracture of plastic material being extruded on the filamentary core, and at least one slotted annularly shaped spring having canted fins for rotating the core tube with respect to the die to improve the properties of the extruded plastic material.

7. In an extruding apparatus for applying a continuous covering of an extrudable plastic material to a continuously advancing filamentary core including an extrusion cylinder having a bore formed therein, a stock screw mounted rotatably within the bore for advancing plastic material therealong, and an extrusion head mounted at the exit end of the cylinder and provided with an extrusion passage formed therein which communicates with and extends transversely across the end of the bore formed in the cylinder and a stationary extrusion die positioned at the exit end of the extrusion passage and having a tapered aperture therein, the improvement which comprises a cylindrical core tube mounted rotatably and slidably within the extrusion passage and having a longitudinally extending bore through which a filamentary conductor may be advanced toward the tapered aperture in the die and having a tapered nose adjacent to and complementary to a portion of said tapered aperture, vibratory means for reciprocating the core tube axially continuously with respect to the die to cause high frequency variations in the space between the die and core tube to reduce the melt fracture of plastic material being extruded on the filamentary core, and means for rotating the core tube with respect to the die to improve the properties of the extruded plastic material.

8. In an extruding apparatus for applying a continuous covering of an extrudable plastic material to a continuously advancing filamentary core including an extrusion cylinder having a bore formed therein, a stock screw mounted rotatably within the bore for advancing plastic material therealong, and an extrusion head mounted at the exit end of the cylinder and provided with an extrusion passage formed therein which communicates with and extends transversely across the end of the bore formed in the cylinder and a stationary extrusion die positioned at the exit end of the extrusion passage and and having a tapered aperture therein, the improvement which comprises a cylindrical core tube mounted rotatably and slidably within the extrusion passage and having a longitudinally extending bore through which a filamentary conductor may be advanced toward the tapered aperture in the die and having a tapered nose adjacent to and complementary to a portion of said tapered aperture, vibratory means for reciprocating the core tube axially continuously with respect to the die at approximately 20,000 cycles per second to cause high frequency variations in the space between the die and core tube to reduce the melt fracture of plastic material being extruded on the filamentary core.

References Cited in the file of this patent

UNITED STATES PATENTS

| | | |
|---|---|---|
| 2,127,857 | Bond | Aug. 23, 1938 |
| 2,740,988 | Henning | Apr. 10, 1956 |
| 2,778,059 | Henning | Jan. 22, 1957 |

FOREIGN PATENTS

| | | |
|---|---|---|
| 638,095 | Great Britain | May 31, 1950 |